United States Patent [19]
Nakamura et al.

[11] Patent Number: 5,987,529
[45] Date of Patent: Nov. 16, 1999

[54] INVOKING A METHOD IN AN OBJECT-ORIENTED COMPUTER PROGRAM

[75] Inventors: Hiroaki Nakamura, Yamato; Tamiya Onodera, Tokyo-to, both of Japan

[73] Assignee: International Business Machines Corporation, Armonk, N.Y.

[21] Appl. No.: 08/832,655

[22] Filed: Apr. 4, 1997

[30] Foreign Application Priority Data

Apr. 10, 1996 [JP] Japan .................................... 8-087857

[51] Int. Cl.$^6$ .................................................. G06F 13/00
[52] U.S. Cl. ............................................ 709/303; 709/300
[58] Field of Search .................................. 709/204, 205, 709/206, 207, 212, 213, 216, 217, 250, 300, 301, 302, 303, 304, 305; 712/220, 225; 707/10, 103

[56] References Cited

U.S. PATENT DOCUMENTS

| | | | |
|---|---|---|---|
| 5,379,426 | 1/1995 | Foss et al. | 395/683 |
| 5,535,391 | 7/1996 | Hejlsberg et al. | 395/709 |
| 5,581,760 | 12/1996 | Atkinson et al. | 395/702 |
| 5,590,334 | 12/1996 | Saulpaugh et al. | 395/683 |
| 5,701,485 | 12/1997 | Guillen et al. | 395/683 |

*Primary Examiner*—Viet D. Vu
*Attorney, Agent, or Firm*—J. P. Sbrollini

[57] ABSTRACT

Message sending can be performed quickly making efficient use of memory space. A class object C is obtained (110) from a specified receiver object. The class object C contains an instance variable pointing to a dispatch table for the class to obtain (120) a dispatch table D. From the code which is an argument of a vmicall instruction, a method M of the address stored in the entry of the code in the dispatch table is retrieved (130). The card which is the other argument of the vmicall instruction is compared (140) with the card number stored in the method M retrieved in step 130. If the card and the card number are not identical, the selector mismatch handler is invoked to locate the correct method to be invoked (150). Then, the method M is invoked (160). In the selector mismatch handler, it is determined whether the dispatch table D for the class C is the default one, and if it is the default dispatch table, the dispatch table for the class C is allocated. Then, the method corresponding to the class C and the card which is the argument of the selector mismatch handler is located, a new code is assigned to the selector of that method, and the address of the method M is stored in the entry of the newcode in the previously prepared dispatch table D. Finally, the method M is returned.

9 Claims, 10 Drawing Sheets

INVOKING A METHOD IN AN OBJECT-ORIENTED COMPUTER PROGRAM

FIELD OF THE INVENTION

The present invention relates to the execution of a message sending in an object oriented program, and more specifically to a method for implementing a message sending in which a small number of small dispatch tables are used to reduce the cost of a message sending to the cost of the array reference and indirect procedure call, and improve the memory efficiency.

BACKGROUND ART

As a procedure call is a basic computing paradigm in a procedural language, a message sending is a basic computing paradigm in an object oriented language. Accordingly, to efficiently implement message sending is indispensable for efficiently implementing an object oriented language. However, in an object oriented language, a method invoked in the execution of a message sending varies depending on the class of the receiver object, and cannot be determined at compilation time. This is called dynamic binding of the method, and a task called a method lookup must be carried out at run time. Thus, the processing of message sending becomes heavy and produces a bottleneck in the execution performance.

A method lookup is to locate a method to be executed from a pair of a class (type) of a receiver object and a selector (the name of a method). One useful implementation method for method lookup is a dispatch table method. The basic idea of this method is that a method lookup is performed "in advance" for the possible combinations of classes and selectors and the results are stored in an array called a dispatch table, and the cost of the method lookup is the cost of the array reference.

Specifically, numbers are assigned to selectors, and a dispatch table is created for each class. For each selector s which a certain class C can understand, the corresponding method is looked up, and its address is stored in the entry of the CODE(s) in the dispatch table of the class C (CODE is a mapping from a selector set to a positive integer, and represents the numbering of selectors). For example, the address is stored in the header of an object so that the dispatch table is easily traced from the object. With this, an instruction in a high-level language for instructing the execution of a message sending substantially becomes the following pseudo C code.

(*receiver→dispatchTable[CODE(selector)])(receiver, arg1, arg2, . . . );

Thus, the method lookup results in array reference, and the cost of the message sending decreases to the cost of the array reference and indirect procedure call. This is equivalent to the cost of calling the virtual function of C**.

Figure 11:
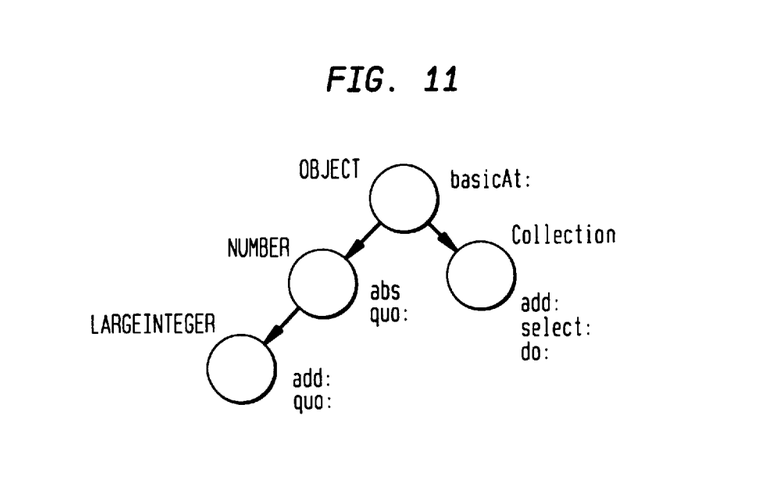
FIG. 11 is a figure showing an example of the class hierarchy.
Figure 12:
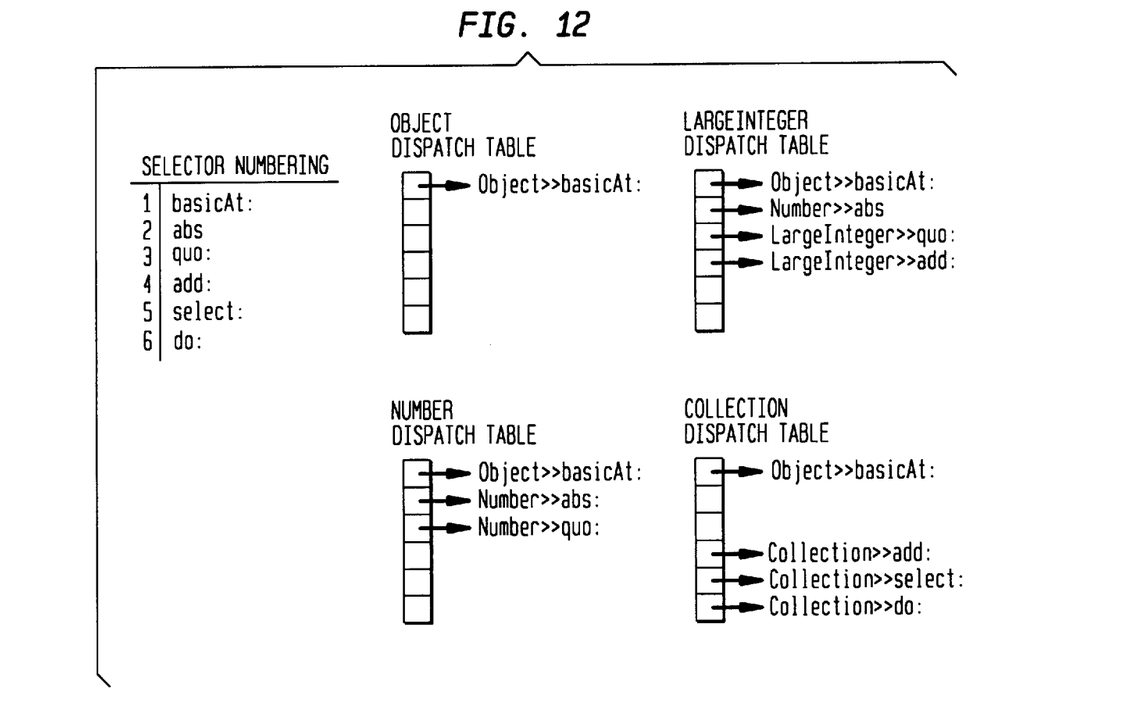
FIG. 12 is a figure for explaining a simple dispatch table method.

In a simple dispatch table method, a CODE function is used in which unique numbers are assigned to all the selectors. A class hierarchy as in FIG. 11 is taken by way of example. There are six different selectors as a whole, and eight methods are defined in four classes. In FIG. 11, on the right to the node corresponding to a class, the selectors of the method defined in that class are written. FIG. 12 shows an example of the dispatch tables and the numbering of selectors in the simple method which are created in the case of a class hierarchy such as in FIG. 11.

Taking the memory efficiency of the simple method, dispatch tables having a size of the number of selectors exist by the number of classes. If the size of an entry of a dispatch table is assumed to be four bytes, the memory consumption of the example of FIG. 11 is 6×4×4 bytes=96 bytes. Although it seems that the example of FIG. 11 has no problem with the simple method, it is not practical in view of the memory consumption as shown by Table 1 if applied to a vast commercial system.

TABLE 1

| System | Number of classes | Number of selectors | Memory efficiency Consumption (byte) | Filling rate (%) |
|---|---|---|---|---|
| A | 1,356 | 10,051 | 54M | 4.5 |
| B | 3,241 | 17,342 | 255M | 1.0 |
| C | 1,956 | 13,474 | 80M | 2.3 |

A dispatch table is a so-called sparse array when applied to a large system such as a commercial system, and most of the entries are not used. That is, one class cannot understand all the selectors existing in a system, but can understand only a small subset of them. Accordingly, as shown in Table 1, the filling rate, namely, the proportion of the "memory consumption of the entries which are not empty" to the "memory consumption of a dispatch table" is several percent, which is very low.

In view of the foregoing, memory efficiency is subject to improvement, and several methods are actually proposed. Typical compression methods, such as row displacement and selector coloring are known.

Figure 13:
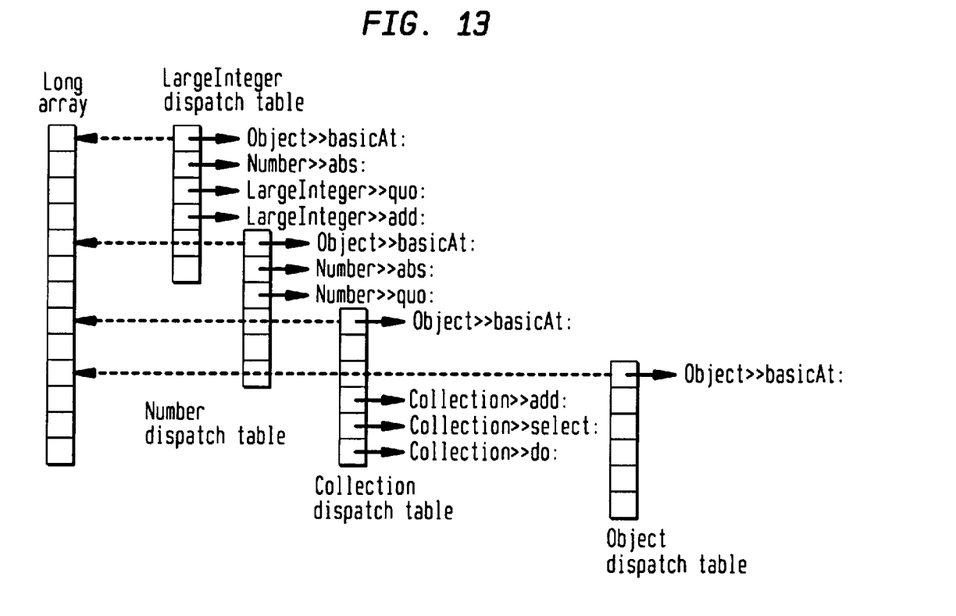
FIG. 13 is a figure for explaining the compression of dispatch tables according to the row displacement.

The concept of the row displacement is that a plurality of sparse arrays are packed into one long array. For instance, the dispatch table in FIG. 12 are packed as shown in FIG. 13. The "Row displacement (for each class)" column in Table 2 shows the filling rate when the described simple method is applied to a commercial system and compression is performed by the row displacement.

TABLE 2

| | Filling Rate (%) | | |
|---|---|---|---|
| System | Row displacement (for each class) | Selector coloring (upper limit) | Row displacement (for each selector) |
| A | 50 | 42 | 99.8 |
| B | 55 | 43 | 99.7 |
| C | 55 | 57 | 99.7 |

Figure 14:
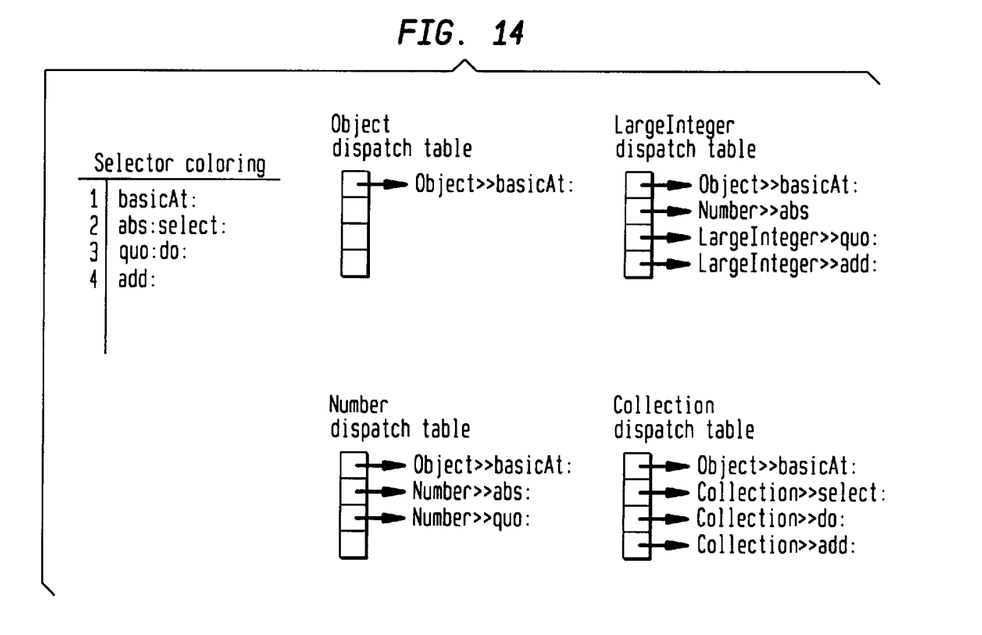
FIG. 14 is a figure for explaining the compression of dispatch tables according to the selector coloring.

Selector coloring is based in the view that unique numbers need not be assigned to all the selectors. If two selectors are understood by the same class, it is said that the two selectors conflict, but it is only needed to assign a different number insofar as they conflict. The specific sequence of performing the numbering can be reduced to the so-called graph coloring problem. That is, the problem that a graph obtained by making nodes from selectors and drawing arcs between the conflicting selectors is colored with as small a number of colors as possible. The number assigned to a selector in this way is called the color or color number of the selector. An example of the coloring for the selectors in FIG. 11 and the dispatch tables formed according to it are shown in FIG. 14. (This coloring is actually optimal.)

In selector coloring, the size of a dispatch table is equal to the number of colors. And, the optimal number of colors is not smaller than the number of selectors which one class can understand. From this, the lower limit of the memory consumption and the upper limit of the filling rate can be determined. The limit of the filling rate is shown in the "Selector coloring (upper limit)" column in Table 2.

On the other hand, row displacement has a variation that can be called a change of concept. That is to assign numbers to classes and make a dispatch table for each selector, rather than to assign numbers to selectors and make a dispatch table for each class. The completed dispatch tables are also packed into one long array. As shown in the "Row displacement (for each selector)" column in Table 2, the filling rate increases to nearly 100% if this variation is applied to a commercial system. The reason for this is that the algorithm for packing used in the row displacement prefers many short arrays to a few long arrays. As apparent from the comparison between the number of classes and the number of selectors in Table 1, many short arrays are created if a dispatch table is made for each selector.

Three compression methods have been described above, but the problem with the dispatch table is that memory efficiency is not satisfactory even if the filling rate is 100%. Memory efficiency for a filling rate of 100% is shown in Table 3. If as a result the virtual image is increased by 50%, or it is not practical. (Smalltalk includes a virtual machine controlling the whole system in cooperation with hardware, and a virtual image including application programs and the like.)

TABLE 3

| | Filling rate of 100% | | |
|---|---|---|---|
| System | Size of virtual image (M bytes) | Memory consumption (M bytes) | Ratio to virtual image (%) |
| A | 3.81 | 3.10 | 81 |
| B | 7.12 | 7.69 | 108 |
| C | 4.77 | 2.47 | 52 |

What is, the dispatch table method is excellent as an implementation method for message sending in the point of time efficiency, but still has problems with memory efficiency and it not considered to be practical.

To clarify the difference between the subject invention described below and background art, a problem in the use of a compression technique for the dispatch table method is described.

A phenomenon called selector mismatch occurs if row displacement or selector coloring is used, requiring action to be taken. Selector mismatch is described by an example of selector coloring. First, a message sending expression "aNumber quo: 7" is taken, which means that the message of a selector called quo: is sent to an object called aNumber with an argument of 7. If selector coloring is provided as shown in FIG. 14, the result of the compilation of this message sending expression is given as the following pseudo C code.
//The color number of quo is 3.
(*aNumber→dispatchTable[3])(aNumber,7)

If the variable aNumber "erroneously" points to a Collection object, the method of the do: selector is invoked even though the quo: selector cannot be understood in the Collection class. This is the selector mismatch phenomenon, which of course should not be overlooked. Countermeasures should be taken such as a technique of card number matching may be used. First, a unique number called a card number is assigned to each selector in addition to the color number, and the card number of the selector of a method is stored in the method. And, if a message sending occurs, the "card number of the selector in the message sending expres-sion" is compared with the "card number of the selector of the method to be invoked." If card number matching is used, the result of the compilation of the above message sending expression is expressed by the following psuedo C code.

```
//the color number of quo: is 3, and the card number is 26.
method = aNumber->dispatchTable[3];
if    (method->selectorCard = = 26)
      (*method)(aNumber,7)
else
      SelectorMismatchHandler(. . .);
```

The maintenance and management of the card number is not so expensive. For instance, it is possible that all the selectors are registered in a hash table called a selector table, and the index of this table is used as the card number. The size of the selector table is sufficient if it is about two times the number of the selectors.

The above described selector mismatch handler SelectorMismatchHandler generates an exception DoesNotUnderstand. However, no selector mismatch occurs unless a different object is indicated or some error occurs.

Further, a method close to the above described simple method is described in Published Unexamined Patent application No. 5-20082. Moreover, a description on limiting the number of the entries of a table used for message sending is contained in Published Unexamined Patent Application No. 6-214884.

However, such references do not describe a method for increasing memory efficiency while maintaining the time efficiency of the dispatch table method described above.

Accordingly, an object of the present invention is to provide a method for increasing the memory efficiency in an object oriented program while maintaining the time efficiency of the dispatch table method.

SUMMARY OF THE INVENTION

To accomplish the above described object, numbers (code numbers) are assigned to selectors, and dispatch tables are created for classes and referenced by the selector numbers, to speed up the method finding. However, all the selectors are not numbered, and dispatch tables are not created for all the classes. Utilizing the reference locality possessed by programs, only so-called "hot" selectors are numbered, and dispatch tables are made only for so-called "hot" classes. In particular, the size of a dispatch table is limited to a first predetermined number of entries, and the number of dispatch tables is also limited to a second predetermined number. That is, it is similar to a manner in which a newly created dispatch table is cached in a cache for dispatch tables (capable of storing the second predetermined number of tables), and a newly used method is cached in a dispatch table (capable of storing the first predetermined number of methods). The memory consumption is constant whether the system is large of small, and it is 4 bytes for one entry of a dispatch table as in the above example. For instance, if the first and second predetermined numbers are 64, respectively, the memory consumption is 16K bytes. It can be reduced to an amount less than even 1% of the virtual image in the commercial system in Table 1.

The dispatch table is treated in a manner similar to the usual cache. That is, if there is an empty area when a new dispatch table is created, the empty area is used, and if there is no empty area, an entry in the existing dispatch table is expelled and used according to an algorithm such as FIFO (First In First Out) or LRU (Least Recently Used).

As the execution of an application program or the like proceeds, a new method (the address of it) enters a dispatch table, and in this case, a number (code) is assigned to the selector of that method and then the new method is placed in the index of the code. Thus, the size of a dispatch table is equal to the numbers used (equal to the first predetermined number) and the numbers become short if methods are successively used, and in this case, a code to be discarded is selected from the codes being used according to the algorithm such as FIFO or LRU as described above. By this discarding, the assignment of the code to the selector is canceled, and inconsistencies occur here and there in the virtual image. These inconsistencies are not collectively corrected, but they are corrected stepwise through the selector mismatch handler described below as occasion demands. That is, the selector mismatch handler executes a method lookup and receives the assignment of a code, and stores the address of an appropriate method in the entry of a code number in an appropriate dispatch table, and when this method is used next time, the entry of this code number in this dispatch table is referenced.

By the operation of such selector mismatch handler, the collective recovery processing of inconsistencies can be avoided and the method invoking can be sped up and the memory efficiency can be increased even if the number of dispatch tables and the number of the entries of them is limited and the updating is performed as occasion demands.

To summarize the above, a process for looking up and invoking a specified method in a class of a specified receiver object in an object oriented program, wherein a card number is assigned to a selector which is the name of the method in advance, and a dispatch table having a predetermined number of entries is provided for each class of the object as occasion demands, and in the dispatch table, an address of the method to be executed is stored in an entry of the code number assigned to the selector of the method is provided. The process includes the steps of: (a) directing a class of the specified receiver object, a code number of an entry assumed to store an address of the specified method, and a card number of the selector of the specified method; (b) retrieving a method addressed by an address stored in an entry of the dispatch table which is specified by the directed class and code number; (c) comparing a card number of a selector of the retrieved method with the card number of the selector of the specified method; (d) detecting a method matching with the card number of the selector of the specified method and the class of the specified receiver object if the card number are not identical; (e) assigning a code number to the selector of the specified method, and storing an address of the detected method in an entry for the assigned code number in the dispatch table for the class of the specified receiver object; (f) making the code number in the directing step identical with the assigned code number; and (g) invoking the method detected in the detecting step.

Further, the step (e) may include a step of, if the assignable code numbers contain unused code numbers, assigning one of the unused code numbers to the selector of the specified method.

Further, the step (e) may include a step of, if unused code numbers do not exist, assigning the least recently used code number to the specified method.

Further, the step (e) may include a step of, if unused code numbers do not exist, detecting a selector among the selectors to which code numbers are already assigned, which selector does not conflict with the selector to which a code number is to be assigned, and assigning the code number of the detected selector.

Moreover, the step (e) may include the steps of: determining whether a dispatch table is prepared specifically for the class of the specified receiver object; and allocating a dispatch table if a dispatch table is not prepared specifically for the class of the specified receiver object.

Further, the number of the dispatch table may be limited to a predetermined number, and the above table allocating step may include the steps of: determining whether the predetermined number of dispatch tables are used; and, if the predetermined number of dispatch tables are used, discarding the least recently used dispatch table, and allocating it for the specified receiver object.

In addition, in the comparing step, it is usually carried out to invoke the retrieved method if the card numbers are identical.

One aspect of the present invention has been shown above, and to make a special system having such functions and to make a storage device storing program codes for causing a computer to implement such functions can usually be carried out by those skilled in the art understanding the following embodiment.

PREFERRED EMBODIMENT

An embodiment of the invention is described starting with the preparation step.

(1) Preparation step

Figure 1:
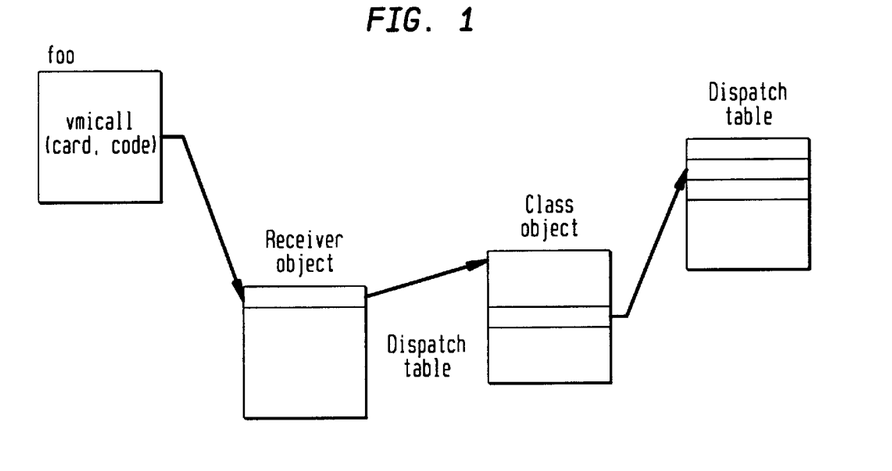
FIG. 1 is a diagrammatic view showing how a message sending is performed in the present invention.

Usually, in a message sending, the selector of a specified method is sent to a specified receiver object along with a specified argument. If a dispatch table method such as described above is used in the implementation of this sending, the construction as shown in FIG. 1 is provided. That is, the message sending in a method called "foo" is directed to a receiver object, in which a pointer to its class object is placed. And, to the class object, an instance variable called dispatchTable is added to point to the dispatch table for the class. If an entry of the dispatch table is retrieved using the code number assigned to the selector of the specified method, the address of the specified method can be obtained. Initially, the instance variable dispatchTable addresses to the default dispatch table. The system has one default dispatch table, and in the all entries, the address of a special method called selectorMismatchRaiser is stored. That is, in the first message sending, the selectorMismatchRaiser method is always retrieved, and the selector mismatch handler selectorMismathHandler is invoked, as detailed later.

Further, if a user describes a message sending instruction in a high-level language, he specifies a receiver object, a selector, and an argument if necessary. When such message sending instruction is compiled, it is transformed into push instructions for the receiver object and the argument, if specified, followed by vmicall instruction having the above described card number and code number as the arguments (for the byte code). Since the contents of the vmicall instruction are described later in detail, their description is omitted here. If compiled to a machine language, a code for performing an operation similar to the vmicall instruction is generated.

Further, a code manager for controlling a finite number of code assignments is provided. Since the operation of the code manager is also described later, its only mentioned here. Similarly, since the number of dispatch tables is limited, their assignment may be changed. Thus, a dispatch table manager is necessary.

Further, each selector of a method is assigned a unique card number when generated. This is similar to the background art.

The following shows by what operation the message sending instruction described in a high-level language is processed after the above preparation is made.

(2) Execution process

It is assumed that, in a given object, a state occurs in which a message sending must be performed for the first time. The message sending instruction in this object is expressed in the following code, if it is a byte code.
push 345
push 3
vmicall (26,1)
where 345 is a receiver object, and 3 is an argument. Further, they are followed by the above described vmicall instruction, and of which 26, the argument of this instruction, is the card number of the selector of the method, and similarly, 1 is a code number. However, since this is the first message sending, no method lookup has been performed, and this code number is an initially entered number having no meaning. Accordingly, the interpreter of the byte code interprets the vmicall instruction as follows. (Description by the pseudo C code.)

```
void vmicall(card,code) {
    //Get the receiver from the stack
        receiver=. . . ;
    //Perform a quick method lookup by array indexing
        Method method = receiver->Klass->dispatchTable[code];
    //Check cards to see if a selector mismatch does not happen.
    if (method ->card!=card)
        method = selectorMismatchHandler(receiver->Klass,card,code);
    //Invoke the method
        invoke(method)
    }
}
```

Figure 2:
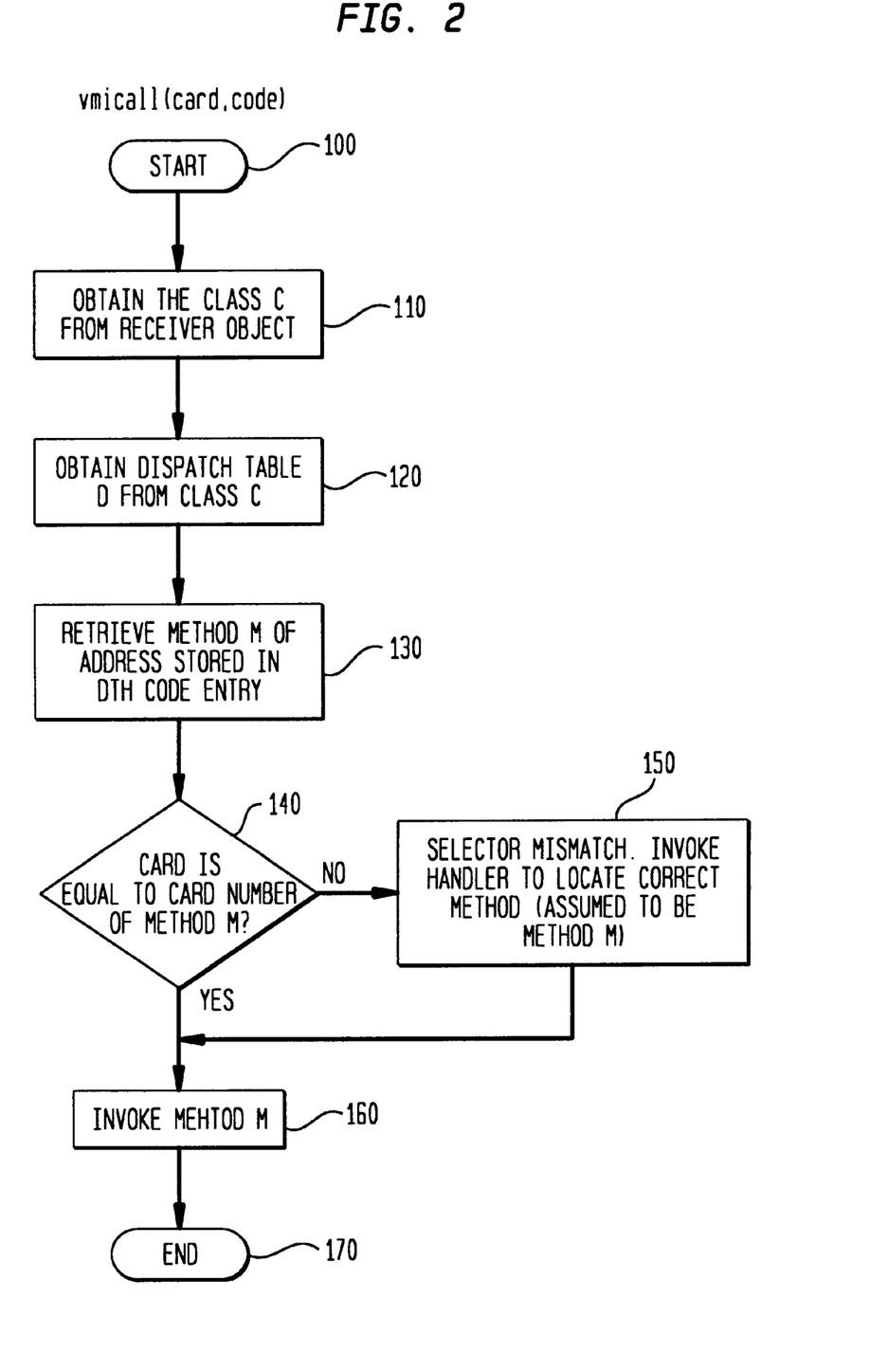
FIG. 2 is a flowchart for explaining the processing by a vmicall instruction.

The interpretation of the vmicall instruction is described using FIG. 2. The process is started in step 100, and by the specified receiver object, its class object C is obtained (step 110). This is done by retrieving the receiver object put in a stack before vmicall. Further, since the receiver object contains a pointer to its class object, the class object C can be obtained by drawing it in.

As described in the preparation step, in the class object C, an instance variable pointing to the dispatch table of its class is provided, and a dispatch table D can be obtained (step 120). In this example, the dispatch table D is the default dispatch table D because this is the first message sending. And, from the code which is an argument of the vmicall instruction, the method M of the address stored in the entry of the code number in the dispatch table is retrieved (step 130). However, in the default dispatch table D, the address of the selectorMismatchRaiser method is placed in all entries. And, the card which is the other argument of the vmicall instruction is compared with the card number stored in the retrieved method M (step 140). In this example, since the retrieved selectorMismatchRaiser method is a special method, it is different from the method to be called. Thus, the card which is the argument is not equal to the card number of the selectorMismatchRaiser method. Accordingly, the selector mismatch handler described later is called to locate the correct method to be called. This is assumed to be the method M (step 150). And, if this method M is invoked, the first desired method is invoked (step 160). Further, in step 140, if the card number of the retrieved method M is equal to the card which is the argument, the process immediately goes to step 160 from step 140 since there is no problem if the retrieved method is invoked.

The above interpretation is made, and it may have been made clear that the selector mismatch handler plays an important role in invoking the correct method. Now, the operation of the selector mismatch handler is described.

(3) Selector mismatch handler

The interpretation of the selector mismatch handler in the interpreter of the byte code is described below by the pseudo C code.

```
Method selectorMismatchHandler (klass,card,code) {
    //Allocate a dispatch table if necessary
    if (klass->dispatchTABLE==defaultDispatchTABLE)
        klass->dispatchTABLE=allocDispatchTABLE(klass);
    //Perform a general lookup.
    Method method;
    if((method=lookupBycard(klass,card))==0){//Does not understand
    the mess age}
    //Ask getSelectorCode() or the code of the selector.
    currentCode = getSelectorCode(card);
    //Stores the method into the dispatch table at the selector code.
    Klass->dispatchTABLE[currentCode]=method;
    //Backpatch the code argument of the icall instruction if
    necessary.
    if (currentCode!=code) instructionpointer[-1]=currentCode.
    return method;
]
```

Figure 3:
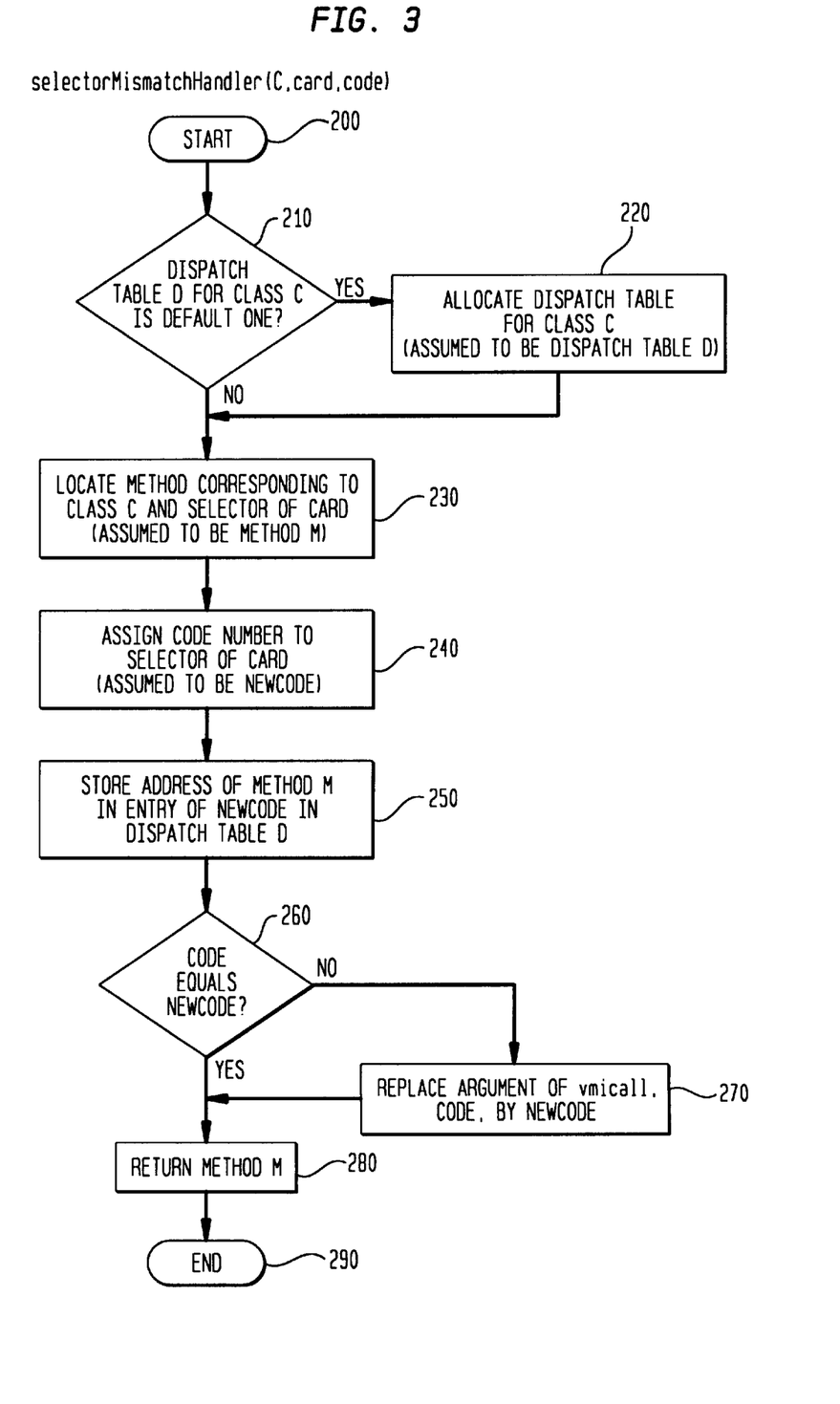
FIG. 3 is a flowchart for explaining the processing by the selector mismatch handler.

The interpretation of the selector mismatch handler is described using FIG. 3. The process is started in step 200, and it is determined whether the dispatch table D of the class C is the default one (step 210). If it is the default dispatch table, a dispatch table for the class C is allocated (step 220). The allocated dispatch table is assumed to be the dispatch table D. The dispatch table allocating process (dispatch table manager) is described later. In the above example, the default dispatch table is shown because it is the first message sending, and the process goes to step 220 to allocate the dispatch table for this class.

And, the method corresponding to the class C and the card which is the argument of the selector mismatch handler selectorMismatchHandler is located (step 230). This located method is assumed to be a method M. Naturally, the address of the method M is obtained. Since this lookup process is the method lookup process which has conventionally been performed, no more description is made in this application. Then, a code number is assigned to the selector of this card. The code number assigning process (code manager) is also described later. A newly assigned code is called newcode (step 240). Since the address of the correct method to be called and the code number assigned to the selector of the method have been obtained in this way, the address of the method M is stored in the entry of the newcode in the previously prepared dispatch table D (step 250).

Then, it is determined whether the code which is the argument of the selector mismatch handler selectorMismatchHandler is equal to newcode (step 260). If the code and newcode are different the code which is the argument of the vmicall instruction is replaced with newcode (step 270). In the previous example, the code was 1. If the newcode assigned in step 240 is 3, vmicall (26,1) is rewritten to vmicall(26,3). This allows the address of the correct method M to be immediately obtained from the dispatch table d if the same message sending is carried out again, without any change.

If the newly assigned newcode is the same as the code in step 260, the address of the correct method M can be obtained next time without rewriting vmicall. Then, the retrieved method M is returned to vmicall (step 280). The method M is invoked by vmicall as described above.

(4) Dispatch table allocating process (dispatch table manager)

As described in step 220 in FIG. 3, it is needed to prepare dispatch tables for the class C. However, the number of dispatch tables is limited, as described in the section "Summary of the invention." Thus, dispatch tables may be short when a dispatch table is allocated for the class C. If dispatch tables are short, the dispatch table used by some class should be taken away for the class c.

In this case, the hardware cache can be referenced. For instance, to use an empty area if any, or to invalidate the least recently used data for a new writing can be applied. That is, the dispatch table for a necessary class is allocated up to the upper limit number by which dispatch tables can be created. And, if the upper limit number is reached, such process may be performed as to invalidate the dispatch table for the least recently used class and allocate the particular dispatch table for a class newly requiring it, or to invalidate the dispatch table which has been maintained for the longest time since it was allocated to the particular class and allocate that dispatch table for a class newly requiring it. Such process forms may be arbitrarily selected, and a change may be made as occasion demands.

Figure 4:
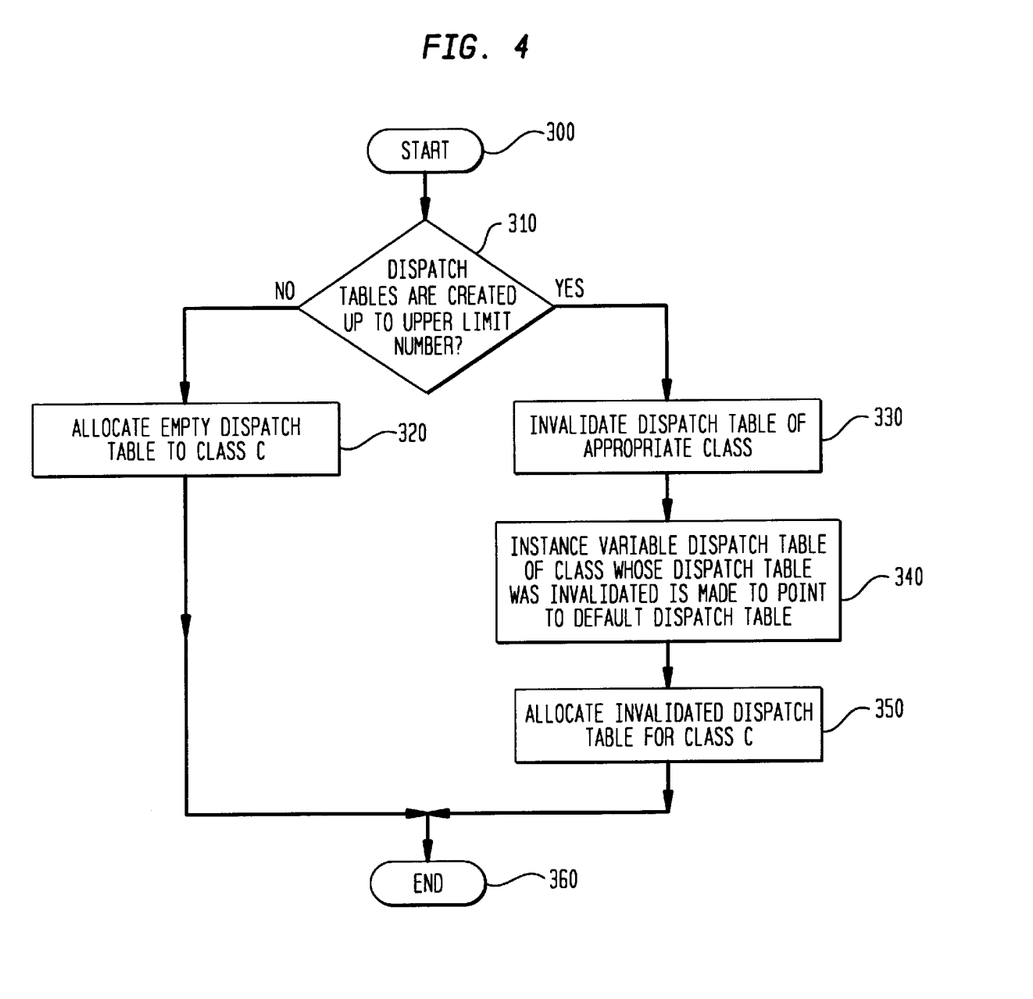
FIG. 4 is a figure showing an example of the dispatch table allocating process.

FIG. 4 shows a flow showing the overview of the dispatch table allocating step. First, the process is started in step 300, and it is determined whether dispatch tables have been created up to the upper limit number (step 310). If they have not been created up to the upper limit number, an empty dispatch table is allocated to the class C (step 320). Further, if the upper limit number of dispatch tables have been created and there is no empty dispatch table, the dispatch table of an appropriate class is made invalid (step 330). This dispatch table of an appropriate class is selected by a method as described above. Then, the dispatchTable instance variable of the class object of the class for which the dispatch table was made invalid is made to point to the default dispatch table (table 340). By this, the transition from step 210 to step 220 in FIG. 3 is performed if a message sending is made to the class for which the dispatch table was made invalid, and a new dispatch table is allocated when needed later.

then, the invalidated dispatch table is allocated as a dispatch table for the class C, and the dispatchTable instance variable of the class object of the class C is made to point to this dispatch table (step 350). By this, a new allocation is smoothly performed even if there is no dispatch table to be allocated for a given class, and there is no effect on other classes.

(5) code number assigning process (code manager)

Although, in step 240, a code number is simply assigned to the selector of a card, a problem may occur that there is no code number of assigned, because the number of code numbers is limited as with dispatch tables. Of course, if there is an unassigned code number, that code number can be assigned to a selector. However, as in the allocation of dispatch tables, if there is no code number to be assigned, which code number is to be reassigned to a new selector is a problem. The simplest way is to reference the hardware cache as described above, and reassign the least recently used code number to a new selector. Further, the oldest selector-code number pair may be located to reassign the code number. If the code number assignment can be performed at fast speed, any of such processes for selecting a code number for reassignment may be used, and the implementing person can select a proper method.

However, differently from the previous case of dispatch tables, no problem may occur even if many selectors are assigned to the same code number. For instance, if a program has a class structure as in FIG. 11, there is no conflict because no class exists which can receive both the selector quo: and the selector select:. Now, if no assignable code number exists, a code is already assigned to the selector select:, and it is needed to newly assign a code to the selector quo:, then the code of a certain selector may be reassigned, but from the relationship between the selector select: and the selector quo:, sufficient discrimination is provided in the dispatch table even if the same code number is assigned to the selector select: and the selector quo:.

Figure 5:
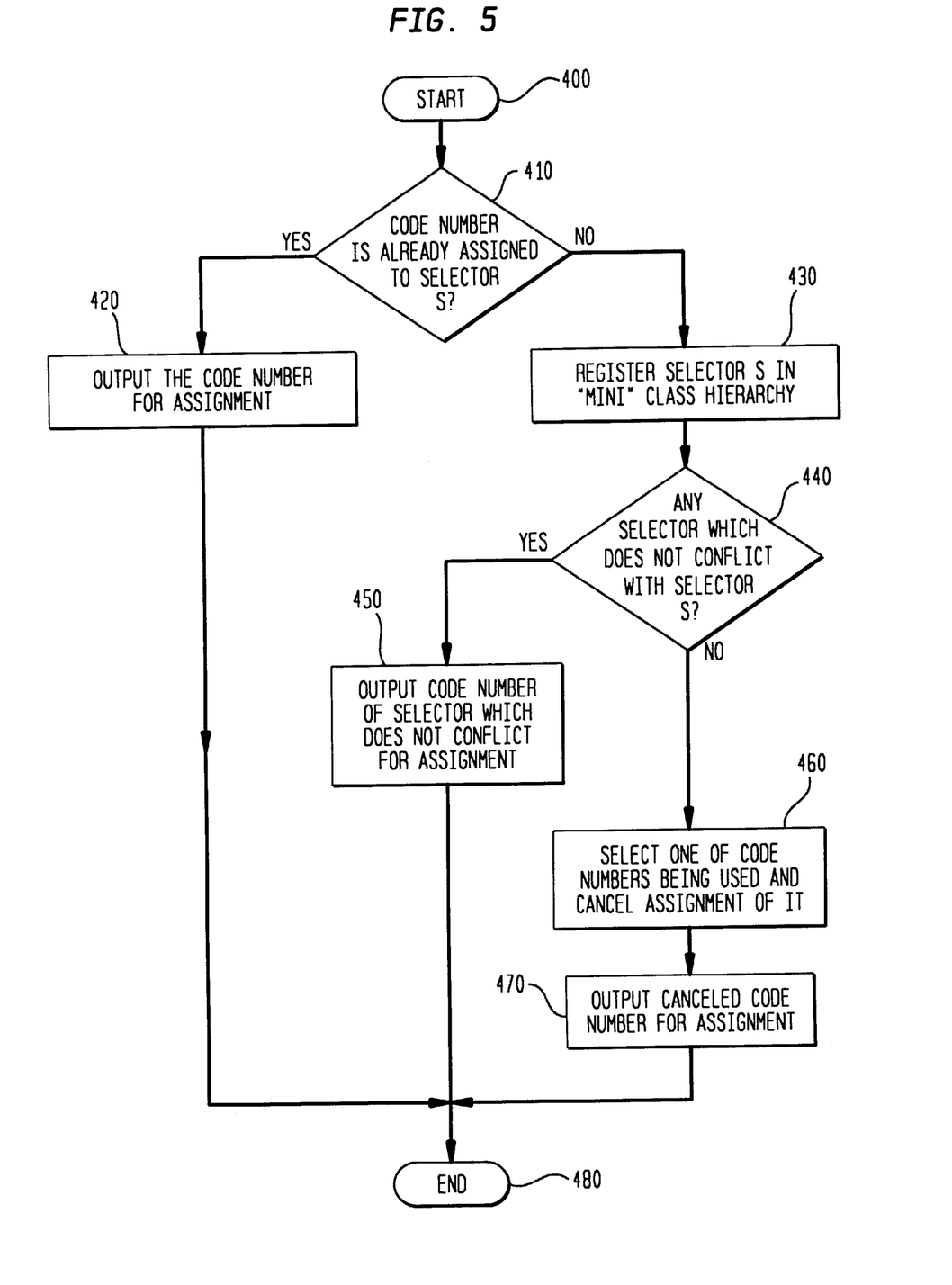
FIG. 5 is a figure showing an example of the code assignment process.

One example of the code number assignment is described using FIG. 5. This FIG. 5 is on the presumption that there is no unused code number. If there is an unused code number, it may be used. The process starts in step 400, and it is determined whether a code number is already assigned to a selector S (step 410). If assigned, that code number may be outputted for assignment (step 420). However, if not assigned, the selector S is registered in the corresponding class in a "mini" class hierarchy consisting of only the classes which have dedicated dispatch tables (step 430). As previously used, conflict means that a class which can receive both of two selectors exists on the "mini" class hierarchy. The "mini" class hierarchy is provided to detect the conflict between selectors. Accordingly, if a class is newly used, a dispatch table is newly assigned, and the class is registered in the "mini" class accordingly. Further, if the dispatch table of a class is discarded, the class is removed from the "mini" class hierarchy. A selector is registered in the class when it is assigned a code number. If a code number is canceled, the selector of that code number is removed from the all classes.

Then, it is determined whether there is even one selector which does not conflict with the selector S (step 440). If there is, the code number of the selector which does not conflict is outputted for assignment to the selector S (step 450). Further, if there is no selector which does not conflict, one of the code numbers being used is selected, and the assignment of this is canceled (step 460). The selector which was using the canceled code number is removed from the "mini" class hierarchy. The selection of the code number to be canceled can be made by using any of the above described methods. Then, the canceled code number is outputted to be assigned to the selector S (step 470).

The above is merely an example, and even if there is an unused code number, the code of the same selector may be used if the same selector is already registered.

Description is now made to how the consistency of the dispatch table is held by the selector mismatch handler or the like as described above. As previously described, the numbers of dispatch tables and the entries of them are limited. Accordingly, the cancellation of a code number to a selector usually occurs, and inconsistencies are generated here and there in the virtual image which contains the contents of dispatch tables and vmicall instructions having a code number pointing to an entry in the dispatch table as the argument. Generally, the system must immediately recover the consistencies. However, it is not allowed in the system of the present invention that the execution significantly stops to recover the consistency. The reason for this is that the cancellation of the code number assignment which results in inconsistencies occurs when the code number assignment is requested, and the request for the code number assignment occurs in the midst of the execution. It is not preferred to carry out a processing such as scanning all the methods in the system to find inconsistent portions.

Figure 6:
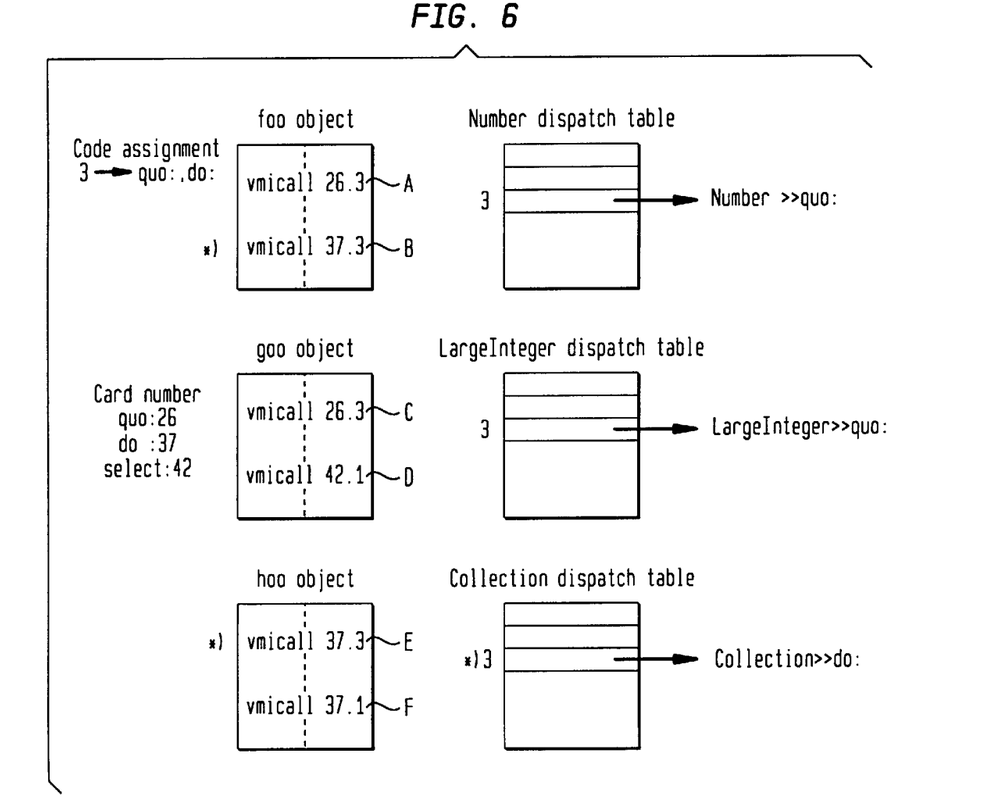
FIG. 6 is a figure for explaining how the consistency is recovered in dispatch tables and a virtual image.

Accordingly, inconsistencies are not globally and collectively recovered in the present invention. Of many inconsistent portions, the recovery processing of only those which are necessary is carried out by the selector mismatch handler or the like as occasion demands. For instance, as shown in FIG. 6, if a code 3 is previously assigned to selectors quo: and do: and the assignment to do: is canceled, inconsistencies occur in the portions marked with *). However, as long as the value of the third entry of the dispatch table for the class Collection is unchanged, these inconsistent states do not actual harm. Thus, if a vmicall instruction marked with *) is executed with the object of the class Collection being as the receiver object, the correct method is invoked.

Figure 7:
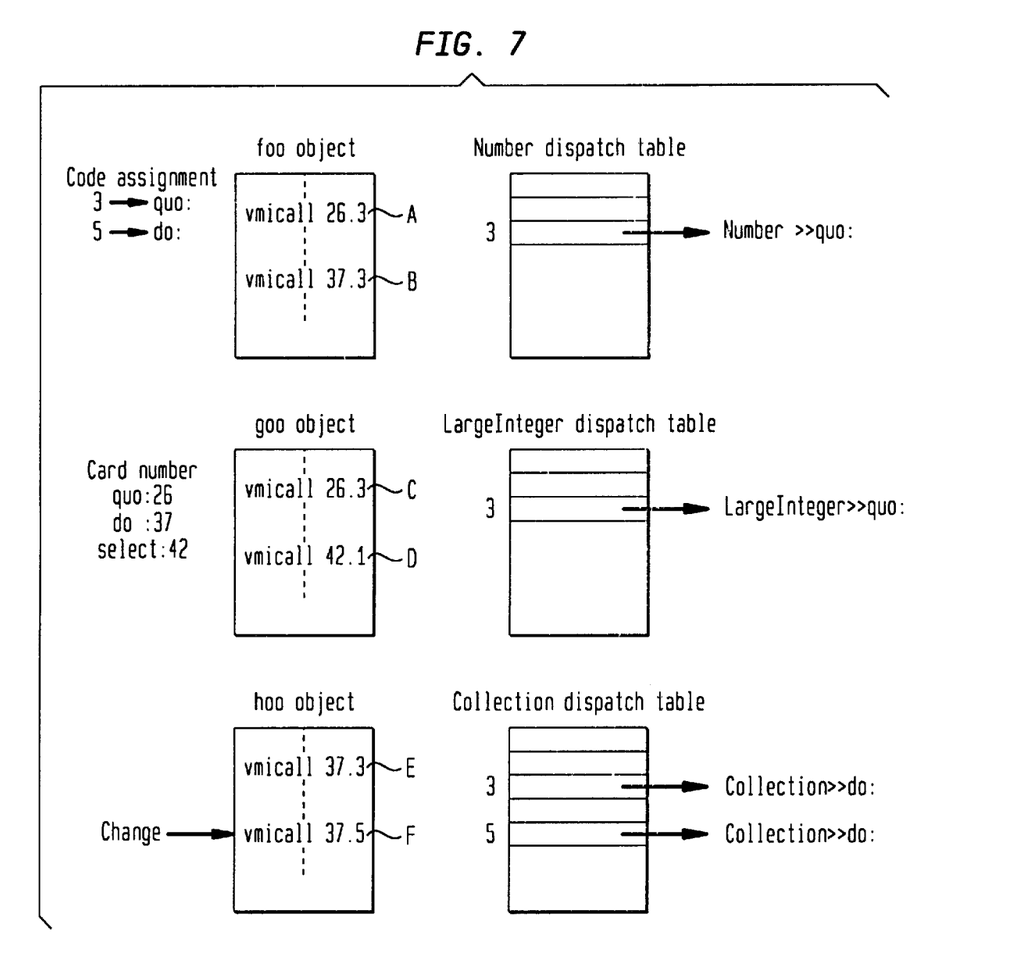
FIG. 7 is a figure for explaining how the consistency is recovered in dispatch table and a virtual image.

Further, the vmicall instruction as shown by F in FIG. 6 is an instruction which has never been executed, and it is to instruct the invoking of a method in a class or super-class of the receiver object, the selector of which is do:. And, if it is executed this time with the object of the class Collection being the receiver object, and the code number assignment is carried out through the selector mismatch handler as described above, thereby to assign 5 as the code number of the selector do:, then the argument of the vmicall instruction is changed to 5 as shown by F in FIG. 7. Further, the address of the method having the selector do: is stored in the fifth entry of the dispatch table for the class Collection. In the class Collection, the address for the method do: is inputted to two entries, but this also does no harm.

Figure 8:
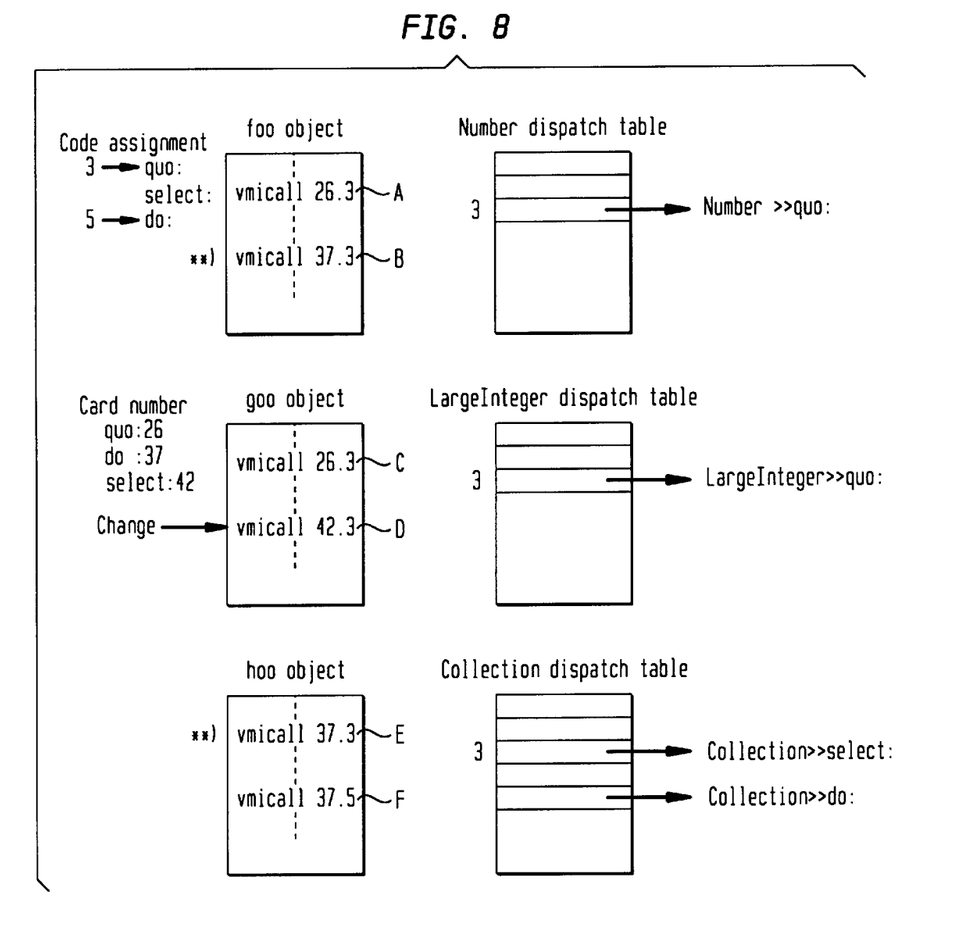
FIG. 8 is a figure for explaining how the consistency is recovered in dispatch tables and a virtual image.

Moreover, the vmicall instruction as shown by D in FIG. 6 is also an instruction which has never been executed, and it is to instruct the invoking of a method in a class or super-class of the receiver object, the selector of which is select:. If this vmicall (42,1) is executed with the object of the class Collection being the receiver object, a card number mismatch occurs, and the selector mismatch handler is invoked to perform a code number assignment. It is assumed that a code 3 is assigned to the selector select: as in FIG. 8. Then, since the code 3 is previously assigned to the selector do: in the initial FIG. 6, an inconsistency occurs in the portion marked with ) in FIG. 8. However, the execution of the vmicall (37,3) of this ) does no harm, because the selector mismatch handler is invoked in the inspection of the card number and the correct method is located. In addition, the vmicall instruction of this **) is correctly rewritten by the selector mismatch handler.

The case has been shown above in which, if dispatch tables exist and inconsistencies occur in the contents of them, the selector mismatch handler corrects the entry and vmicall instruction in a needed dispatch table as occasion demands. On the other hand, the same thing can be said with the case in which the dispatch table for a certain class becomes the default dispatch table to cause inconsistencies. Surely, the selector mismatch handler is invoked by a card number inspection, a dispatch table is allocated for a necessary class, a necessary code number is assigned and the address is stored in an entry in the dispatch table, and the correct method is invoked.

Figure 9:
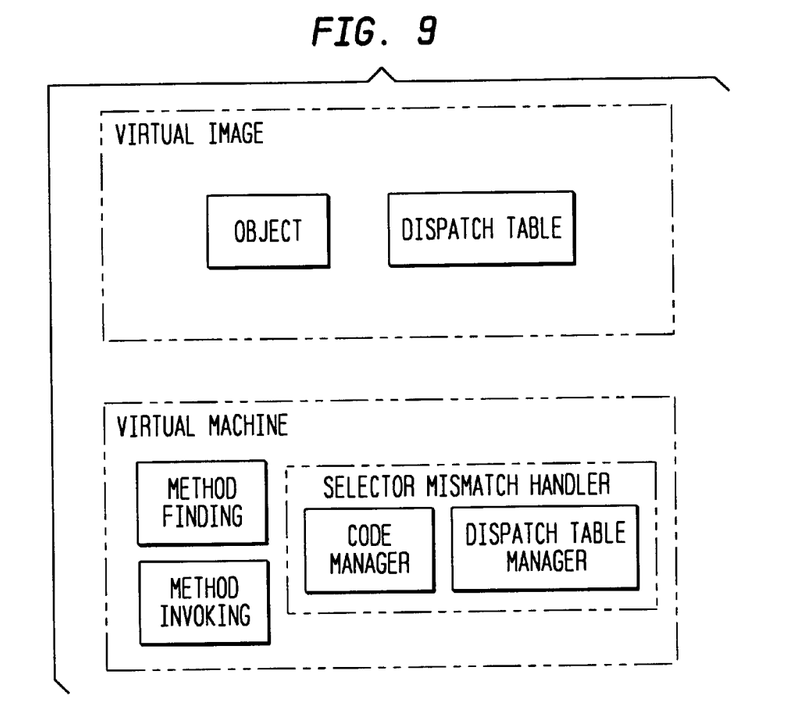
FIG. 9 is a figure for explaining the system structure.
Figure 10:
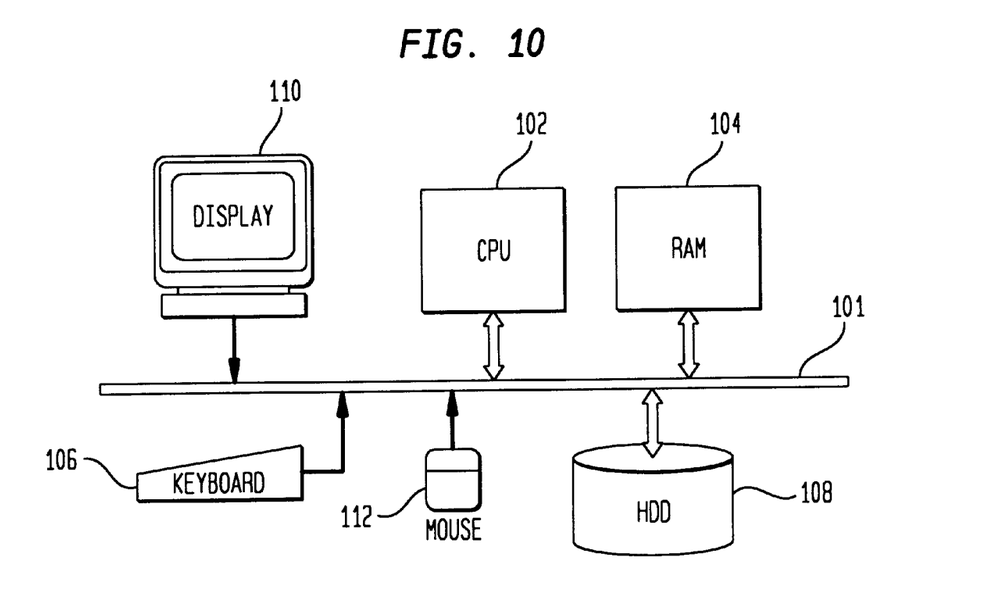
FIG. 10 is a diagrammatic view of a conventional computer.

To implement the above tasks in a computer program according to the Smalltalk language, the structure as in FIG. 9 can be taken. In Smalltalk, the computer program can be generally divided into a virtual image and a virtual machine. The objects and dispatch tables in this application belong to the virtual image. On the other hand, the selector mismatch handler including the method lookup, code manager, and dispatch table manager, and the method invoking unit for invoking the objects belong to the virtual machine. The computer for executing the program with such structure may be a conventional computer as shown in FIG. 10.

Further, a special apparatus can also be provided to implement the present invention. This can be accomplished by implementing the functions of the virtual machine in FIG. 9 by hardware just as they are. Since the virtual machine is originally to arbitrate between the hardware and the virtual image, it is well-known matter for those skilled in the art to implement similar functions by hardware.

An embodiment of the present invention has been shown above, but the present invention is not limited to the above embodiment. As previously described, various forms may be taken for the allocation of dispatch tables and the assignment of codes. Further, although the number of dispatch tables has been limited, only the number of the entries of dispatch tables can be limited. That is, one dispatch table is assigned to each class. The memory consumption in the virtual image increases as the number of dispatch tables increases, but the above described management of the dispatch table itself becomes unnecessary, and the process becomes simple accordingly. Such variation depends on the trade-off between the memory efficiency and the execution speed. Therefore, it should be understood that various changes can be made in the above description without departing from the spirit and scope of the invention.

We claim:

1. A process for invoking a specified method in a class of a specified receiver object in an object oriented program, wherein a card number is assigned to a selector which is the name of said method in advance, and a dispatch table having a predetermined number of entries is provided for each class of said object as occasion demands, and in said dispatch table, an address of said method is stored in an entry of the code number assigned to the selector of said method, said process comprising the steps of:

(a) directing a class of said specified receiver object, a code number of an entry assumed to store an address of said specified method, and a card number of the selector of said specified method;

(b) retrieving a method addressed by an address stored in an entry of a dispatch table which is specified by said directed class and code number;

(c) comparing a card number of a selector of said retrieved method with the card number of the selector of said specified method;

(d) detecting a method matching with the card number of the selector of said specified method and the class of the specified receiver object if said card numbers are not identical;

(e) assigning a code number to the selector of said specified method, and storing an address of said detected method in an entry for the assigned code number in the dispatch table for the class of said specified receiver object;

(f) making said code number indicated in said directing step identical with said assigned code number; and (g) invoking the method detected in said detecting step.

2. The process for invoking a specified method as set forth in claim 1, wherein step (e) comprises the step of:

if the assignable code numbers contain unused code numbers, assigning one of said unused code numbers to the selector of said specified method.

3. The process for invoking a specified method as set forth in claim 2, wherein said step (e) comprises the step of:

if said unused code numbers do not exist, assigning the least recently used code number to the selector of said specified method.

4. The process for invoking a specified method as set forth in claim 2, wherein said step (e) comprises the step of:

if said unused code numbers do no exist, detecting a selector among the selectors to which code numbers are already assigned, said selector being not conflicting with the selector to which a code number is to be assigned, and assigning the code number of said detected selector.

5. The process for invoking a specified method as set forth in claim 1, wherein said step (e) comprises the steps of:

determining whether a dispatch table is prepared specifically for the class of said specified receiver object; and allocating a dispatch table if a dispatch table is not prepared specifically for the class of said specified receiver object.

6. The process for invoking a specified method as set forth in claim 5, wherein the number of said dispatch tables is limited to a predetermined number, and said table allocating step comprises the steps of:

determining whether said predetermined number of dispatch tables are used; and if said predetermined number of dispatch tables are used, discarding the least recently used dispatch table, and allocating it for said specified receiver object.

7. The process for invoking a specified method as set forth in claim 1, further comprising the step of:

invoking said retrieved method if said card numbers are identical in said comparing step.

8. A system for controlling invocation of a specified method in a class of a specified receiver object in an object oriented program, wherein a card number is assigned to a selector which is the name of said method in advance, said system comprising:

a dispatch table manager for creating a dispatch table having a predetermined number of entries for each class of said object as occasion demands, and in said dispatch table, storing an address of said method in an entry of a code number assigned to the selector of said method;

a method lookup unit responsive to an instruction including a class of said specified receiver object, a code number of an entry assumed to store an address of said specified method, and a card number of the selector of said specified method, for retrieving a method addressed to by an address stored in an entry of a dispatch table which is specified by said class and said code number in said instruction; and a comparator for comparing a card number stored in said retrieved method with the card number of the selector of said specified method;

said method lookup unit detecting a method matching with the card number of the selector of said specified method and the class of said specified receiver object, if the method lookup unit receives a signal representing a mismatch from said comparator;

said dispatch table manager assigning a code number to the selector of said specified method and storing an address of said detected method in an entry for said assigned code number in the dispatch table for the class of said specified receiver object;

a controller for making said code number in said instruction identical with said assigned code number, and invoking the method detected by said method lookup unit.

9. A storage device including a program code for causing a computer to invoke a specified method in a class of a specified receiver object in an object oriented program, wherein a card number is assigned to a selector which is the name of said method in advance, and a dispatch table having a predetermined number of entries is provided for each class of said object as occasion demands, and in said dispatch table, an address of said method is stored in an entry of the code number assigned to the selector of said method, said program code comprising:

a program code responsive to an instruction including a class of said specified receiver object, a code number of an entry assumed to store an address of said specified method, and a card number of the selector of said specified method, for causing the computer to retrieve a method addressed by an address stored in an entry of a dispatch table which is specified by said class and code number in said instruction;

a program code for causing the computer to compare a card number of the selector of said retrieved method with the card number of the selector of said specified method;

a program code for causing the computer to detect a method matching with the card number of the selector of said specified method and the class of said specified receiver object, if said card numbers are not identical;

a program code for causing the computer to assign a code number to the selector of said specified method, and to store an address of said detected method in an entry of the code number assigned to the selector of said method, in the dispatch table for the class of said specified receiver object;

a program code for causing the computer to make said code number of said instruction identical with said assigned code number; and a program code for causing the computer to invoke the method detected by the computer and said detecting program code.

\* \* \* \* \*